United States Patent
Delchambre et al.

(10) Patent No.: US 9,748,740 B2
(45) Date of Patent: Aug. 29, 2017

(54) SPARK-GAP OF AN ELECTRIC ARC GENERATION DEVICE, AND CORRESPONDING ELECTRIC ARC GENERATION DEVICE

(71) Applicant: ENE29 S.àr.L., Luxembourg (LU)

(72) Inventors: Michael Delchambre, Toulouse (FR); Sergei Labuda, Pins-Justaret (FR); Guillaume Onquiert, Cintegabelle (FR)

(73) Assignee: ENE29 S.àr.L., Luxembourg (LU)

( * ) Notice: Subject to any disclaimer, the term of this patent is extended or adjusted under 35 U.S.C. 154(b) by 0 days.

(21) Appl. No.: 15/023,339

(22) PCT Filed: Sep. 17, 2014

(86) PCT No.: PCT/IB2014/064594
§ 371 (c)(1),
(2) Date: May 12, 2016

(87) PCT Pub. No.: WO2015/040555
PCT Pub. Date: Mar. 26, 2015

(65) Prior Publication Data
US 2016/0268778 A1   Sep. 15, 2016

(30) Foreign Application Priority Data
Sep. 19, 2013 (FR) ..................... 13 59030

(51) Int. Cl.
*H01T 1/22*      (2006.01)
*G01V 1/157*     (2006.01)
*E21B 43/25*     (2006.01)
*E21B 43/00*     (2006.01)

(52) U.S. Cl.
CPC ............. *H01T 1/22* (2013.01); *E21B 43/003* (2013.01); *E21B 43/25* (2013.01); *G01V 1/157* (2013.01)

(58) Field of Classification Search
CPC ......... H01T 13/20; H01T 13/34; H01T 13/32; H01T 1/22; E21B 43/003; E21B 43/25; G01V 1/157
See application file for complete search history.

(56) References Cited

U.S. PATENT DOCUMENTS 2,559,227 A  *  7/1951  Rieber ............... A61H 23/008
                                                     200/83 P
3,225,578 A     12/1965  Krieger
4,345,650 A      8/1982  Wesley
(Continued)

FOREIGN PATENT DOCUMENTS

JP    2007265834 A    10/2007
JP    4352098 B1      10/2009

*Primary Examiner* — Joseph L Williams
*Assistant Examiner* — Jose M Diaz
(74) *Attorney, Agent, or Firm* — Seed IP Law Group LLP

(57) ABSTRACT

A spark-gap of an electric arc generation device for creating a seismic wave comprises: a first electrode connected to a first electrode mounting, a second electrode connected to a second electrode mounting and having a concave surface facing the first electrode and a diameter substantially greater than the diameter of the first electrode, and at least one connection arm connecting the first electrode mounting to the second electrode mounting. The disclosure also relates to an electric arc generation device comprising such a spark-gap.

18 Claims, 4 Drawing Sheets

(56) References Cited

U.S. PATENT DOCUMENTS

| | | | | |
|---|---|---|---|---|
| 4,628,399 A | * | 12/1986 | Shigemori | H01T 4/12 313/325 |
| 4,769,736 A | * | 9/1988 | Boy | H01T 4/12 361/120 |
| 4,905,673 A | * | 3/1990 | Pimiskern | H01T 9/00 601/4 |
| 4,997,044 A | | 3/1991 | Stack | |
| 5,301,169 A | | 4/1994 | Baria et al. | |
| 6,362,945 B1 | * | 3/2002 | Bobert | H01T 1/22 361/120 |
| 6,427,774 B2 | | 8/2002 | Thomas et al. | |
| 8,189,315 B2 | * | 5/2012 | Boy | H01T 4/12 361/117 |
| 8,785,803 B2 | * | 7/2014 | Garner | H01T 1/22 218/13 |
| 9,198,825 B2 | * | 12/2015 | Katragadda | A61H 23/008 |
| 2002/0075125 A1 | | 6/2002 | Yang | |
| 2004/0068209 A1 | * | 4/2004 | Matula | A61B 17/22004 601/4 |
| 2013/0345600 A1 | * | 12/2013 | Katragadda | A61H 23/008 601/4 |

\* cited by examiner

SPARK-GAP OF AN ELECTRIC ARC GENERATION DEVICE, AND CORRESPONDING ELECTRIC ARC GENERATION DEVICE

The invention relates to a spark-gap of an electric arc generation device, as well as to a corresponding spark-gap generation device.

Such a device is intended for placement in a deep well (for example several kilometers deep). Generation of an electric arc is then for example used to create a seismic wave in the soil or to stimulate hydrocarbon production.

Document WO-90/13830 illustrates a prior art device in the field of the present invention. It discloses a source of seismic waves that is usable in a borehole filled with liquid. The device described in that document is intended to create seismic waves, for example in order to conduct a geological survey of the soil. The described source of seismic waves comprises a module supported by a cable and including means for generating a high voltage and for charging a capacitor bank. Then an acoustic wave is created by causing a rapid discharge of the capacitors across a pair of electrodes defining a discharge gap. The electrodes are immersed in a liquid, at the same pressure as the liquid in the borehole (at the electrodes), and are separated by a gap of predetermined width.

FIGS. 3 and 4 of that prior art document show two different embodiments of a spark-gap. According to a first embodiment, a central electrode is arranged at an equal distance from three peripheral electrodes, defining a discharge gap with each of them. The second embodiment proposed therein comprises two similar electrodes placed facing one another while keeping a discharge gap between them.

A similar device can also be used in a wellbore to stimulate oil production. Document WO-01/59252 discloses a device comprising pulsed power sources, with, on the one hand, an electrohydraulic generator that produces an electromagnetic pulse and an acoustic pulse, and on the other hand, an electromagnetic generator that produces an electromagnetic pulse. The embodiment of FIG. 8 of that document illustrates a spark-gap with two electrodes arranged in a flexible sleeve filled with liquid. Each electrode is supported by an electrode mounting, and metal arms connect the two electrode mountings. These arms extend parallel to the electrodes, at a distance from them.

In a structure as illustrated in FIG. 8 of WO-01/59252, during an electrical discharge between the electrodes, it is necessary to prevent a discharge from occurring between an electrode and a metal arm. Such a discharge would be uncontrolled and the energy it dissipates is regarded as lost.

When reducing the size of the spark-gap is desired, the metal arms that can be used for example to provide a current return path, are moved closer to the electrodes and the risk of leakage is increased.

Another technical problem encountered with spark-gaps of the prior art is electrode wear. With each electrical discharge, electrons are stripped from one of the electrodes and wear occurs at the tip of the electrodes. The distance between the two electrodes increases as the spark-gap is used over time, thereby reducing device performance.

Document WO-90/13830 proposes the use of a refractory material such as tungsten to create the ends of the electrodes. Document WO-01/59252 then proposes having a consumable "pencil" style electrode with a consumable central electrode of adjustable length (FIG. 10) or with a filament (11). Another solution proposed by the latter document (FIG. 12) is to pass gas over an electrode, the gas being ionized by the potential difference between the electrodes and thus protecting the electrodes.

The present invention aims to provide a spark-gap in which electrodes are arranged between metal arms, but for which the risk of an electric arc developing between an electrode and an arm is substantially reduced in comparison to devices of the prior art.

Advantageously, the present invention provides a spark-gap of this type that is reduced in size compared to known spark-gaps of the prior art.

A spark-gap according to the present invention also will preferably have a longer life due to controlled wear of the electrodes.

To this end, the invention provides a spark-gap of an electric arc generation device for creating a seismic wave, comprising:

a first electrode connected to a first electrode mounting, a second electrode connected to a second electrode mounting, and at least one connection arm connecting the first electrode mounting to the second electrode mounting.

According to the invention, the second electrode has a concave surface facing the first electrode, and the diameter of the second electrode is substantially greater than the diameter of the first electrode.

In this manner, if an arc produced between the electrodes deviates in the direction of the connection arms which are generally of metal, it can be attracted by the second electrode which presents a large surface area having a "surrounding" shape which promotes its attraction of an electric arc.

In a spark-gap according to the invention, the diameter of the second electrode is more than twice the diameter of the first electrode, and advantageously more than five times the diameter of the first electrode.

To have all points of one end of the first electrode which is facing the second electrode be at the same distance from the concave surface of the second electrode, the concave surface is preferably a substantially spherical surface having its center located at the free end of the first electrode.

To promote the creation of an arc between the first electrode and the second electrode, the concave surface preferably has at least one transverse groove. Thus, the concave surface has at least one sharp edge facilitating the appearance of an electric arc.

A preferred embodiment of the invention, which is easier to implement industrially, provides that the second electrode is made of two parts: a first portion of generally circular cylindrical shape having a free end facing the first electrode, and a second tubular portion bearing the concave surface at one of its ends. In this preferred embodiment, the free end of the first portion advantageously extends the concave surface of the second tubular portion. To allow exact positioning of the second portion relative to the first, the second portion of the second electrode may be fixed for example to the first portion of the second electrode by means of at least one pin.

To further prevent an arc from forming between the first electrode and a connection arm (of metal), the diameter of the second electrode is such that a peripheral edge of the second electrode is less than 2 mm, and preferably less than 0.5 mm, from a connection arm.

The invention also relates to an electric arc generation device, characterized in that it comprises a spark-gap as presented above, and in that the second electrode is connected to the ground of said device. In such a device, the spark-gap may be placed inside a membrane of flexible material containing a liquid.

Details and advantages of the invention will be more apparent from the following description, provided with reference to the accompanying drawings in which.

Figure 3:
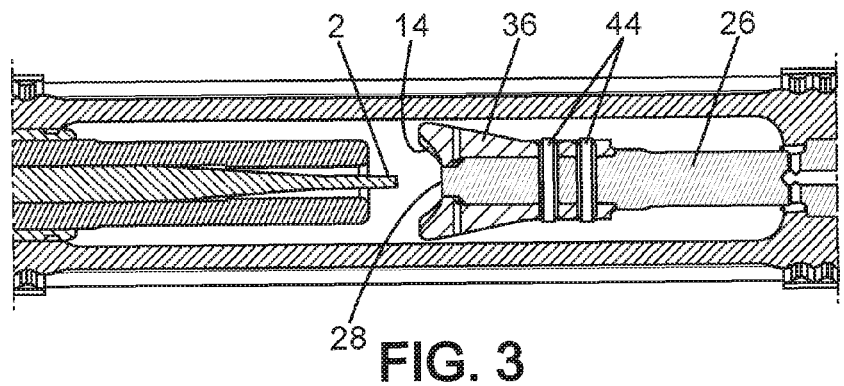
Figure 4:
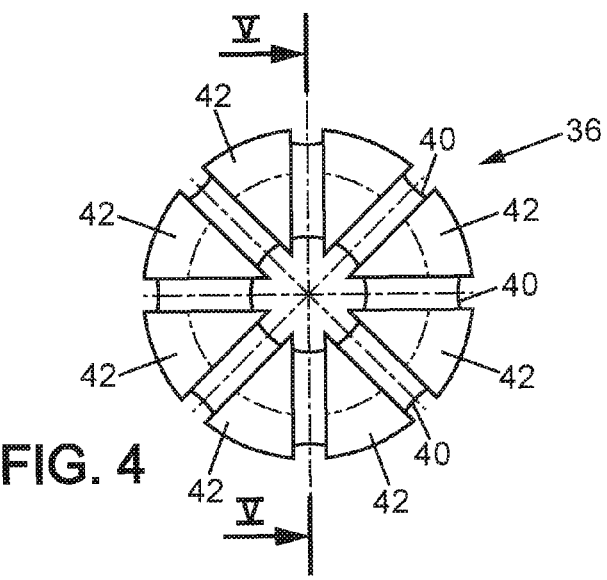
Figure 5:
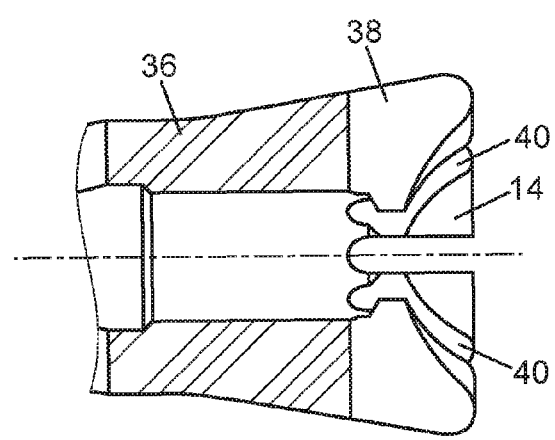
Figure 6:
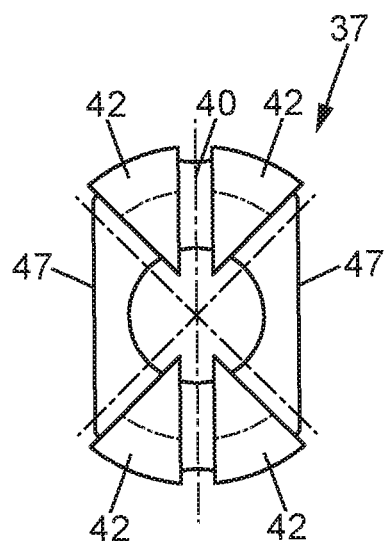
Figure 7:
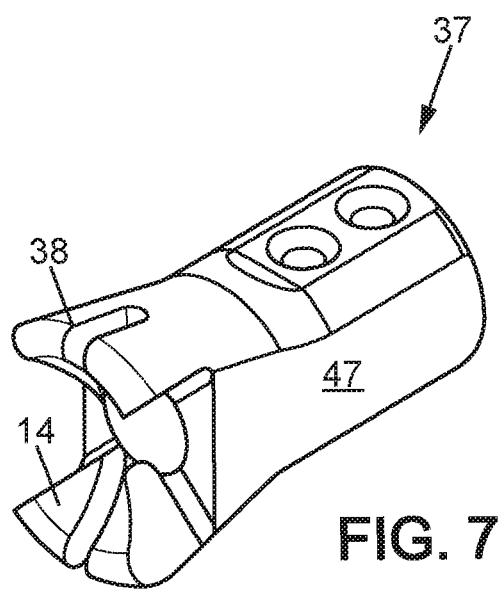
Figure 8:
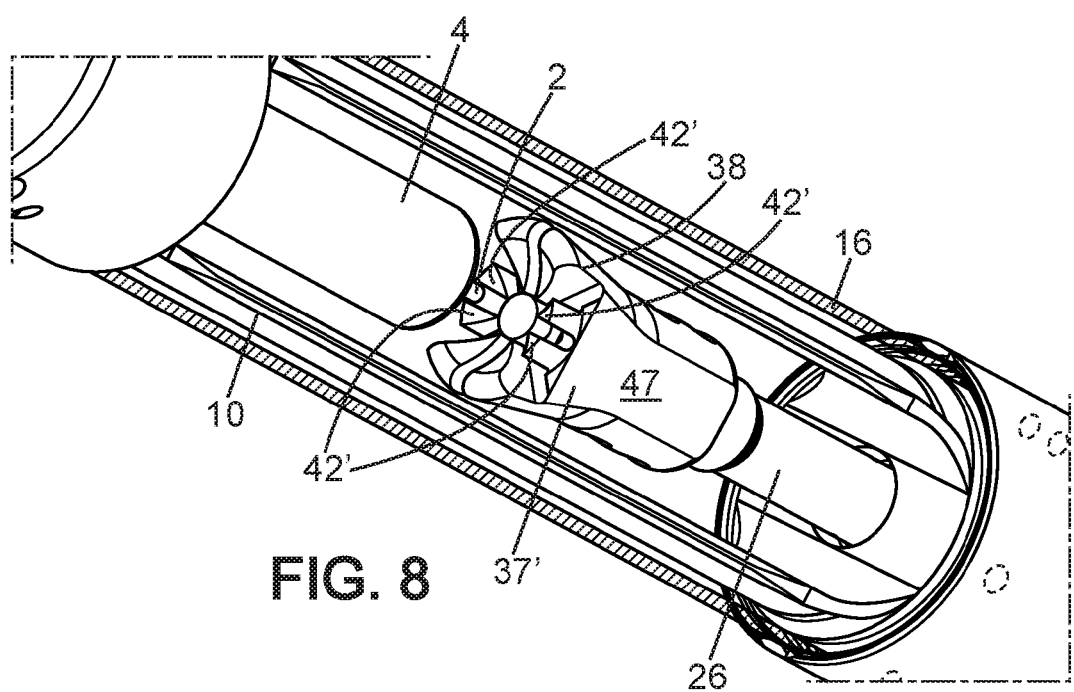

FIG. 3 is a longitudinal sectional view of a spark-gap according to the invention, FIG. 4 is a top view of an electrode of a spark-gap according to the invention, FIG. 5 is a sectional view along V-V in FIG. 4, FIG. 6 is a top view corresponding to FIG. 4, for a variant embodiment, FIG. 7 is a perspective view of a portion of the element shown in FIG. 6, and FIG. 8 is a perspective view of a spark-gap according to a third embodiment of the invention.

Figure 1:
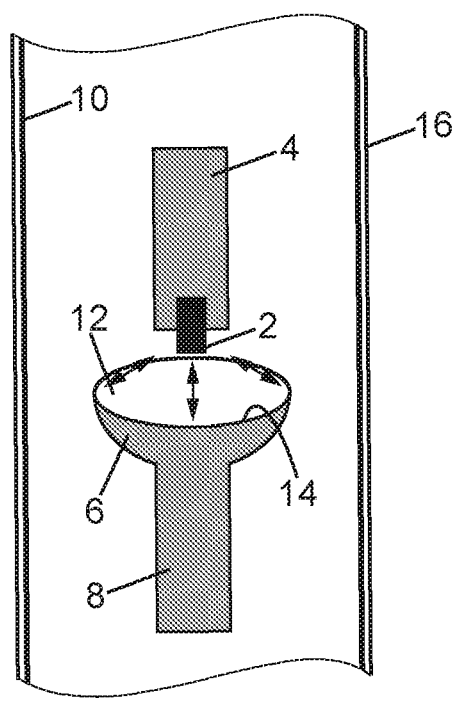
FIG. 1 is a general elevation view of a spark-gap according to the invention.
Figure 2:
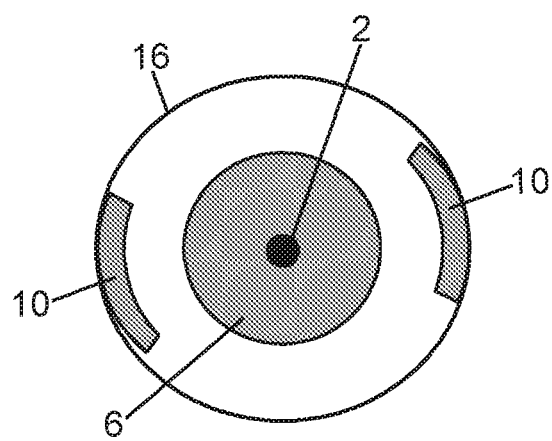
FIG. 2 is a schematic top view corresponding to FIG. 1.

FIGS. 1 and 2 show a highly schematic illustration of the principle of the invention. In these figures, a spark-gap is represented which comprises a first electrode 2 mounted on a first mounting 4, a second electrode 6 mounted on a second mounting 8, and connection arms 10 connecting the first mounting 4 and the second mounting 8.

The first electrode 2 is a known type of electrode. Electrodes disclosed in the prior art documents cited in the preamble of the present document (WO-90/13830 and WO-01/59252, for example) can be used here. For example, the electrode may be in the form of a circular cylindrical rod, possibly provided with a tip at its free end. The first mounting 4 serves as a connection terminal for the first electrode 2. An electronic device of known type, generally comprising a series of capacitors, is used to bring the first electrode to a high electric potential in a very short time while a high intensity current is passing through it.

The second electrode 6 has a particular shape designed to ensure that the current entering from the first electrode 2 travels through the second electrode 6 with no leakage to the connection arms 10 for example such that a discharge region 12 is formed that is entirely comprised between the first electrode 2 and the second electrode 6.

For this purpose, the second electrode 6 has a concave surface 14 whose concavity is oriented towards the first electrode 2, and has a diameter substantially greater than that of the first electrode 2. The second electrode 6 is intended to be connected to ground.

The concave surface 14 shown in FIG. 1 has a cup shape which is preferably such that every point of this shape is substantially equidistant from the first electrode 2. It then has a substantially spherical or ellipsoidal shape.

The first electrode 2 and the second electrode 6 preferably each have an axis of symmetry, and the two axes of symmetry preferably coincide in an axis hereinafter called the longitudinal axis, as illustrated by FIG. 2. One will note in this top view that the first electrode 2 is centered relative to the second electrode 6. One will note in general that the spark-gap is substantially symmetric relative to the axis of symmetry of the electrodes. The connection arms 10 are arranged symmetrically relative to the two electrodes. This embodiment provides two arms but there could be one, three, or any other reasonable number of connection arms 10.

FIGS. 1 and 2 also illustrate a flexible membrane 16 which forms a chamber within which the spark-gap is located and which is intended to be filled with a dielectric fluid. When a wave is generated by a discharge between the electrodes, the wave propagates in the fluid within the chamber and then is transmitted by the flexible membrane 16 to the external fluid (oil, mud, water, or other) in which the device is immersed.

The generation of an electric arc can then be used to create a seismic wave in the soil in order to conduct for example a geological survey of the soil or of the seabed. In another example, the seismic wave created may be used to stimulate hydrocarbon production.

FIG. 3 illustrates one embodiment of the invention in a longitudinal sectional view. The references used in FIGS. 1 and 2 are repeated here and in the following figures to denote similar parts.

We find in FIG. 3 the structure described above with reference to FIGS. 1 and 2, but with further details.

One will note in particular in FIG. 3 that the second electrode is made of two parts, a central portion 26 and a crown 36 mounted on one end of the central portion 26.

The central portion 26 is in the form of a circular cylindrical rod. It is aligned with the first electrode 2 and has a transverse end 28 facing the first electrode 2. The transverse end 28 extends perpendicularly to the longitudinal axis of the spark-gap and has, for example, a circular shape.

The crown 36 is shown in an enlarged scale in FIGS. 4 and 5. As is apparent from these figures, the crown 36 is in the form of a sleeve which internally provides a housing for receiving the free end of the central portion 26 and externally provides a surface which flares out thus defining a flared end 38 intended to face the first electrode 2.

The flared end 38 bears the concave surface 14. This surface is of spherical shape. More specifically, the concave surface 14 is formed of spherical sectors. Firstly, as already indicated, the crown 36 is in the form of a sleeve and therefore has a hole at its center. It is provided here that the hole at the center of the concave surface 14 receives the transverse end 28 of the central portion 26. The housing formed in the crown 36 is machined so that the front surface formed by the transverse end lies flush with the concave surface 14 formed inside the flared portion 38 of the crown 36. Next, one will note that the flared portion 38 has grooves 40 which, in the embodiment of FIGS. 4 and 5, are four in number and thus divide the concave surface 14 into eight sectors 42 regularly distributed around the longitudinal axis. The grooves 40 each lie in a plane containing the longitudinal axis and are offset from one another by 45°.

To establish a good connection between the central portion 26 and the crown 36 and to ensure the correct relative positioning of these two parts, it is proposed in a preferred but non-limiting embodiment to secure the crown 36 by means of pins 44.

The outside diameter of the crown 36 is preferably at least twice the outside diameter of the first electrode 2. In a preferred embodiment, it is about 10 times greater than the diameter of the first electrode 2. The crown 36 preferably extends all the way to the connection arms 10 without touching them. A gap may be provided for example between the crown 36 and each connection arm 10 of a few tenths of a millimeter to a few millimeters, for example between 0.1 mm and 2 mm. Again purely as a non-limiting illustration, one may for example have a first electrode 2 with a diameter of about 4 to 5 mm and a crown 36 having a flared portion of a diameter of approximately 40 to 50 mm. The radius of curvature of the concave surface 14, substantially corresponding to the distance separating the two electrodes, may be for example between 15 and 20 mm.

FIGS. 6 and 7 show a new crown 37 which is a variant of the crown 36 of FIGS. 3 to 5. The general shape of crown 37 follows that of crown 36 but with two parallel flat sections 47 arranged symmetrically with respect to the longitudinal axis (in the mounted position of the crown). The crown 37 thus has a length in a transverse direction, and in another transverse direction perpendicular to the first it has a width less than the length. In this embodiment, the concave surface 14 then has only four sectors 42 and a central groove 40 extending along the length of the crown 37.

This embodiment is suitable for a spark-gap with two connection arms 10. The crown 37 is then aligned with the connection arms 10 such that the sectors 42 come as close as possible to the connection arms 10.

FIG. 8 illustrates a third embodiment of a crown 37' that is very similar to the embodiment of FIGS. 6 and 7. We thus find in FIG. 8 that crown 37' has the general shape of crown 37, with flat sections 47. At the flared portion 38 of crown 37', the concave surface has four sectors 42 but also four other sectors 42' of smaller dimensions than sectors 42.

FIG. 8 illustrates a spark-gap according to the invention in a perspective view, with a section of the flexible membrane 16 cut away to provide a view of the interior of the spark-gap and in particular its electrodes.

In its various embodiments described above and in variants within the scope of a person skilled in the art, we have a second electrode presenting a surface area facing the first electrode that is much greater than in comparable devices of the prior art. Preferably, the different points of the concave surface 14 lie substantially at the same distance from the first electrode 2. It is thus possible to have the consumption of material at the second electrode, which is connected to ground, occur over the entire concave surface 14. An electrical discharge between two electrodes usually follows a path, called the discharge path, that is as short as possible, thus connecting the two closest points of the two electrodes. When the shape of the concave surface is such that all points of this surface are substantially at the same distance from the second electrode, an electrical discharge between the electrodes can then follow a plurality of discharge paths which are distributed across the second electrode. As the wear is thus distributed over a larger area, the distance between the first electrode and the second electrode decreases much less quickly than in known embodiments of the prior art. It is thus possible to maintain optimal spacing between the two electrodes of the spark-gap for a much longer period.

The embodiments of the invention allow preventing the generation of an arc between the first electrode, intended to be connected to a high voltage source, and the metal connection arms used as supports to maintain the structure of the spark-gap. The cup shape given to the second electrode allows it to intercept an arc which does not propagate longitudinally.

Preferably, the concave surface is divided into multiple sectors. Sharp edges are thus created that facilitate initiating the generation of an arc. This feature further discourages an arc from deviating toward the connection arms.

The invention thus provides means of limiting the risk of arc leakage to a connection arm. This makes it possible to reduce the size of a spark-gap having such a structure, meaning with connection arms.

The embodiments in which the second electrode has flat sections facilitate propagation of the shock wave to outside the discharge region (or electric arc generation region).

Of course, having a two-part electrode connected to the ground corresponds to a preferred embodiment of the invention, but, without departing from the scope of the invention, one could very well have a one-part electrode or conversely an electrode of multiple parts, for example as many parts as the concave surface has, as illustrated, sectors and/or "mini" sectors.

The invention is not limited to the embodiments described above by way of non-limiting example and represented in the drawings, nor to the mentioned variants, but concerns any embodiment within the reach of the skilled person that lies within the scope of the following claims.

The invention claimed is:

1. A spark-gap of an electric arc generation device for creating a seismic wave, comprising:
    a first electrode connected to a first electrode mounting,
    a second electrode connected to a second electrode mounting, and
    at least one connection arm connecting the first electrode mounting to the second electrode mounting, wherein:
    the second electrode has a concave surface facing the first electrode,
    the second electrode has a diameter that is substantially greater than a diameter of the first electrode; and
    the concave surface has at least one transverse groove.

2. The spark-gap according to claim 1, wherein the diameter of the second electrode is more than twice the diameter of the first electrode.

3. The spark-gap according to claim 1, wherein the concave surface is a substantially spherical surface having a center located at a free end of the first electrode.

4. The spark-gap according to claim 1, wherein the second electrode is made of two parts: a first portion of generally circular cylindrical shape having a free end facing the first electrode, and a tubular second portion having an end bearing the concave surface.

5. The spark-gap according to claim 4, wherein the free end of the first portion extends through the concave surface of the second portion.

6. The spark-gap according to claim 4, wherein the second portion of the second electrode is fixed to the first portion of the second electrode by at least one pin.

7. The spark-gap according to claim 1, wherein the diameter of the second electrode is such that a peripheral edge of the second electrode is less than 2 mm from a connection arm.

8. An electric arc generation device, comprising a spark-gap according to claim 1, wherein the second electrode is connected to a ground of said device.

9. The device according to claim 8, comprising a membrane of flexible material containing a liquid, wherein the spark-gap is placed inside the membrane.

10. A spark-gap of an electric arc generation device for creating a seismic wave, comprising:
    a first electrode connected to a first electrode mounting,
    a second electrode connected to a second electrode mounting, and
    at least one connection arm connecting the first electrode mounting to the second electrode mounting, wherein:
    the second electrode has a concave surface facing the first electrode,
    the second electrode has a diameter that is substantially greater than a diameter of the first electrode,
    the second electrode is made of two parts: a first portion of generally circular cylindrical shape having a free end facing the first electrode, and a tubular second portion having an end bearing the concave surface, and
    the free end of the first portion extends through the concave surface of the second portion.

11. The spark-gap according to claim 10, wherein the diameter of the second electrode is more than twice the diameter of the first electrode.

12. The spark-gap according to claim 10, wherein the concave surface is a substantially spherical surface having a center located at a free end of the first electrode.

13. The spark-gap according to claim 10, wherein the second portion of the second electrode is fixed to the first portion of the second electrode by at least one pin.

14. The spark-gap according to claim 10, wherein the diameter of the second electrode is such that a peripheral edge of the second electrode is less than 2 mm from a connection arm.

15. A spark-gap of an electric arc generation device for creating a seismic wave, comprising:
    a first electrode connected to a first electrode mounting,
    a second electrode connected to a second electrode mounting, and
    at least one connection arm connecting the first electrode mounting to the second electrode mounting, wherein:
    the second electrode has a concave surface facing the first electrode,
    the second electrode has a diameter that is substantially greater than a diameter of the first electrode,
    the second electrode is made of two parts: a first portion of generally circular cylindrical shape having a free end facing the first electrode, and a tubular second portion having an end bearing the concave surface, and
    the second portion of the second electrode is fixed to the first portion of the second electrode by at least one pin.

16. The spark-gap according to claim 15, wherein the diameter of the second electrode is more than twice the diameter of the first electrode.

17. The spark-gap according to claim 15, wherein the concave surface is a substantially spherical surface having a center located at a free end of the first electrode.

18. The spark-gap according to claim 15, wherein the diameter of the second electrode is such that a peripheral edge of the second electrode is less than 2 mm from a connection arm.

* * * * *